US006635720B1

(12) United States Patent
Tomalia et al.

(10) Patent No.: US 6,635,720 B1
(45) Date of Patent: Oct. 21, 2003

(54) CORE-SHELL TECTODENDRIMERS

(75) Inventors: Donald A. Tomalia, Midland, MI (US); Srinivas Uppuluri, Ypsilanti, MI (US); Douglas R. Swanson, Mt. Pleasant, MI (US); Herbert M. Brothers, II, Midland, MI (US)

(73) Assignee: Dendritech Inc., Midland, MI (US)

( * ) Notice: Subject to any disclaimer, the term of this patent is extended or adjusted under 35 U.S.C. 154(b) by 0 days.

(21) Appl. No.: 09/913,050

(22) PCT Filed: Feb. 15, 2000

(86) PCT No.: PCT/US00/03773

§ 371 (c)(1),
(2), (4) Date: Jan. 24, 2002

(87) PCT Pub. No.: WO00/49066

PCT Pub. Date: Aug. 24, 2000

Related U.S. Application Data

(60) Provisional application No. 60/120,415, filed on Feb. 16, 1999.

(51) Int. Cl.[7] .................................................. C08L 77/00
(52) U.S. Cl. ................................ 525/432; 424/DIG. 16
(58) Field of Search ................... 424/DIG. 16; 525/432

(56) References Cited

U.S. PATENT DOCUMENTS

| | | | | |
|---|---|---|---|---|
| 4,694,064 A | * | 9/1987 | Tomalia et al. | 528/332 |
| 4,737,550 A | * | 4/1988 | Tomalia | 525/418 |
| 5,631,329 A | * | 5/1997 | Yin et al. | 525/417 |
| 6,228,978 B1 | * | 5/2001 | Agarwal et al. | 528/363 |

* cited by examiner

*Primary Examiner*—Ana Woodward
(74) *Attorney, Agent, or Firm*—Karen L. Kimble

(57) ABSTRACT

Core-shell tecto(dendrimers) useful in biomedicine, pharmaceuticals, personal care products, and in other ways analogous to the known uses for dendrimers, hypercomb branched polymers, and other dendritic polymers are the reaction product of a core dendritic polymer molecule having a plurality of terminal functional groups of a first type which are not reactive with each other, and a plurality of shell dendritic polymer molecules having a plurality of terminal functional groups of a second type which are not reactive with each other, but which are reactive with the terminal functional groups of the first type. Each of the shell dendritic polymer molecules is chemically bonded to the core dendritic polymer molecule by a reaction of at least one of the terminal functional groups of the second type with at least one of the terminal functional groups of the first type.

10 Claims, No Drawings

CORE-SHELL TECTODENDRIMERS

This application claims the benefit of provisional application 60/120,415 filed Feb. 16, 1999.

FIELD OF THE INVENTION

This invention relates to a new class of materials generally comprising a core dendrimer molecule and a plurality of shell dendrimer molecules chemically bonded to the surface of the core dendrimer molecule.

BACKGROUND OF THE INVENTION

Dendritic macromolecules have received substantial attention during the past two decades on account of their unusual structural and chemical properties, such as their almost perfect isomolecularity (i.e., polydispersity near unity, e.g., 1.0003 to 1.0005 for dendrimers having a molecular weight of about 10,000), their well defined morphology (i.e., uniform size and shape), and their unusually high chemical functionality; and because of their actual and potential utility in diverse applications, such as in biomedicine, pharmaceuticals, personal care, industry, material science, materials engineering, and research. Known dendritic structures include various dendrimers, regular dendrons, controlled hyperbranched polymers, dendrigrafts, random hyperbranched polymers, bridged dendrimers, and others.

It is widely recognized that dendrons and dendrimers constitute a significant subclass of "dendritic polymers" and represent a unique combination of very high structural complexity, together with extraordinary structural control. The assembly of reactive monomers, branch cells or dendrons around atomic or molecular cores to produce dendrimers according to divergent or convergent dendritic branching principles is well known (see for example M. K. Lothian-Tomalia, D. M. Hedstaand, D. A. Tomalia, A. B. Padias, and H. K. Hall, Jr., Tetrahedron 53, 15495 (1997); D. A. Tomalia, A. M. Naylor and W. A. Goddard III, Angew. Chem. Int. Ed. Engl. 29(2), 138 (1990); and C. J. Hawker and J. M. J. Frechet, J. Am. Chem. Soc. 112, 7638 (1992). Systematic filling of space around cores with branch cells, as a function of generational growth stages, to provide discrete, quantized bundles of mass has been shown to be mathematically predictable (see D. A. Tomalia, Adv. Mater. 6, 529 (1994); P. R. Dvornic, D. A. Tomalia, *Chemistry In Britain*, 30(8), 641 (1994) and P. R. Dvornic, D. A. Tomalia, Macromol. Symp., 98, 403 (1995)). Predicted theoretical molecular weights have been confirmed by mass spectroscopy and other analytical methods. The resulting dendritic architectures have allowed the systematic control of molecular structural parameters such as size, shape, surface functionality, and interior functionality at the lower end of the nanoscale region, e.g., from about 1 to about 15 nanometers. It is well established that dendritic structures can be utilized to define confined spaces at the lower end of the nanoscale region (see for example R. Esfand and D. A. Tomalia, *Chemistry and Industry*, 11, 416 (1997)).

Divergent dendritic growth can be precisely controlled to form ideal dendritic polymers which obey mathematical formulas, at least through the first several generations of growth. However, because the radii of dendrimer molecules increase in a linear manner as a function of generation during ideal divergent growth, whereas the surface cells amplify according to geometric progression law, ideal dendritic growth does not extend indefinitely. There is a critical generation at which the reacting dendrimer surface does not have enough space to accommodate incorporation of all of the mathematically required new units. This stage in ideal dendritic growth is referred to as the de Gennes dense-packed stage. At this stage, the surface becomes so crowded with terminal functional groups that, although the terminal groups are chemically reactive, they are sterically prohibited from participating further in ideal dendritic growth. In other words, the de Gennes dense-packed stage is reached in divergent synthesis when the average free volume available to the reactive surface group decreases below the molecular volume required for the transition state of the desired reaction to extend the growth to the next generation. Nevertheless, the appearance of the de Gennes dense-packed stage in divergent synthesis does not preclude further dendritic growth beyond this point. It has been demonstrated by mass spectrographic studies that further increase in the molecular weight can occur beyond the de Gennes dense-packed stage. In the case of an ammonia core polyamidoamine (PAMAM) dendrimer, dendritic growth has been observed to generation 12. However, at that generational level, experimentally observed molecular weights are lower than the mathematically calculated values. Products resulting from continuation of dendritic growth beyond the dense-packed stage are "imperfect" in structure, because some of the surface groups in the precursor generation are sterically precluded from undergoing further reaction. The number of functional groups on a dendrimer which has been grown past the de Gennes dense-packed stage will not correspond to the ideal, mathematically predicted value for that generation. In the case of PAMAM dendrimers ($NH_3$ core), a gradual digression from theoretical masses occurs for generations 5–8, followed by a substantial break (i.e., about 23%) between generation 8 and generation 9 PAMAM dendrimers. This discontinuity is interpreted as a signature for the de Gennes dense-packed stage. It should be noted that the digression from theoretical masses for successive generations continues to decline monotonically with each successive generation beyond generation 9. A similar trend is noted for other dendrimers.

In addition to the deviation from expected molecular weight, the interior of dendritic polymers of higher generations beyond the de Gennes dense-packed stage becomes less accessible to guest molecules. For example, it has been shown that the interior of hydroxyl terminated (ethylene diamine core) PAMAM dendrimers from generation 1 to generation 6 are completely accessible to copper(II) ions, whereas the interior of generation 7 through 10 PAMAM dendrimers is not accessible to copper(II) ions. Subsequent treatment of solutions containing copper(II) ions and generations 1 through 10 dendrimers, with hydrogen sulfide resulted in copious precipitates for solutions containing PAMAM dendrimers of generations 1 through 3, completely soluble solutions with generations 4 through 6, and precipitates with generations 7 through 10. Analysis (TEM) of the solutions containing generations 4 through 10 PAMAM dendrimers confirmed that the generations 4 through 6 dendrimers contained copper sulfide within their interiors, and were functioning as host container molecules. Similar analyses indicated that generations 7 through 10 dendrimers were functioning as surface scaffolding for copper(II) ions, with essentially no copper in the interior.

In various applications, particularly in biomedical applications, it may be desirable to provide larger dendritic polymer structures, having a high loading capacity (i.e., the ability to contain drugs and/or diagnostic compounds), and having relatively predictable sizes, shapes and chemical valency to ensure consistent, controllable performance.

However, the largest known dendrimer diameter is about 30 nanometers. The larger dendrimers have relatively dense surfaces which can be impermeable to a variety of drugs and/or diagnostic compounds. Accordingly, the ability of the higher generation dendrimers to act as carriers for drugs and/or diagnostic compounds is generally limited to their ability to retain such compounds by coordination with surface functional groups.

Although bridged dendrimers and dendrimer clusters are known, these structures are generally limited to random branched and/or crosslinked structures of non-uniform size, shape and polydispersity. Accordingly, known bridged dendrimers, crosslinked dendrimers, and dendrimer clusters do not exhibit sufficient predictability, regularity and/or uniformity for use in certain applications, such as a carrier for drug delivery and/or delivery of diagnostic compounds.

U.S. Pat. No. 4,737,550 discloses bridged dense star polymers. The patent discloses that the bridged dense star polymers are comprised of at least two dense star polymer molecules which are covalently bonded together, preferably through terminal groups of the dense star polymer molecules. The patent does not provide any specific disclosure of a core-shelled dendritic polymer molecule of the type disclosed herein, and does not teach how core-shell dendritic polymer molecules of the type disclosed herein can be made. It is generally disclosed in the patent that excess dendrimers with nucleophilic terminal groups may coat a dense star or dendrimer seed.

Therefore, there remains a need for larger dendritic structures having relatively precisely defined, uniform structure, shape and size.

SUMMARY OF THE INVENTION

The present invention provides a composition of matter comprising the reaction product of a core dendritic polymer molecule having a plurality of terminal functional groups of a first type which are not reactive with each other and a plurality of shell dendritic polymer molecules having a plurality of terminal functional groups of a second type which are not reactive with each other, but which are reactive with the terminal functional group of the first type, and processes for preparing the composition of matter. The shell dendritic polymer molecules are chemically bonded to the core dendritic polymer molecule by a reaction of at least one of the terminal functional groups of the second type with at least one of the terminal functional groups of the first type. The reaction product comprises at least 40% of the theoretical maximum number ($M_m$) of shell dendritic polymer molecules that can be bonded to the core dendritic polymer molecule, wherein $$M_m = \frac{2\pi}{\sqrt{3}}\left(\frac{r_1}{r_2}+1\right)^2,$$

where $r_1$ is the radius of the core dendritic polymer molecule and $r_2$ is the radius of the shell dendritic polymer molecule.

In a particular aspect of the invention, the composition of matter is the reaction product of a single dendritic core polymer molecule, a plurality of shell dendritic polymer molecules chemically bonded to the surface of the core dendritic polymer molecule to form a first shell surrounding the core molecule, and a plurality of dendritic polymer molecules bonded to the shell dendritic polymer molecules to form a second shell surrounding the first shell.

The process for preparing the composition of matter comprising the reaction product of a core dendritic polymer molecule and a plurality of shell dendritic polymer molecules surrounding and chemically bonded to the core dendritic polymer molecule comprises providing the core dendritic polymer molecules, providing the shell dendritic polymer molecules, and combining core dendritic polymer molecules with the shell dendritic polymer molecules in a solution. The dendritic core polymer molecules each have a plurality of terminal functional groups of a first type which are not reactive with each other, and the shell dendritic polymer molecules have a plurality of terminal functional groups of a second type which are not reactive with each other, but which are reactive with the terminal functional groups of the first type. The amounts of core dendritic polymer molecules and the shell dendritic polymer molecules are selected so that the ratio of shell dendritic polymer molecules to core dendritic polymer molecules is at least 4:1. After the core dendritic polymer molecules and the shell dendritic polymer molecules are combined, the terminal groups of the first type are reacted with the terminal groups of the second type to form a core-shell polymer which is the reaction product of a single core dendritic polymer molecule and a plurality of shell dendritic polymer molecules that are chemically bonded to, and surround, the core dendtritic polymer molecule. The number of shell dendritic polymer molecules bonded to each core dendritic polymer molecule is at least 40% of the theoretical maximum number ($M_m$) that can be bonded to the core dendritic polymer molecule, wherein $$M_m = \frac{2\pi}{\sqrt{3}}\left(\frac{r_1}{r_2}+1\right)^2,$$

where $r_1$ is the radius of the core dendritic polymer molecule and $r_2$ is the radius of the shell dendritic polymer molecule.

DESCRIPTION OF THE PREFERRED EMBODIMENTS

The preferred core-shell dendritic polymers of this invention are believed to represent a new class of materials comprising a single core dendritic polymer molecule surrounded by a plurality of shell dendritic polymer molecules, each of which is chemically bonded to the surface of the core dendritic polymer molecule, to form a shell or outer layer around the core dendrimer molecule. The resulting core-shell structure is thus formed from a plurality of elemental units (i.e., the core dendritic polymer molecule and the plurality of shell dendritic polymer molecules bonded to the core dendritic polymer molecule) assembled in a relatively predictable manner. The resulting reaction product has been termed a core-shell tecto(dendrimer) by the inventors.

The core-shelled dendritic polymers of this invention are characterized by, and differ from, known dendritic polymer structures, including bridged dense star polymers, by their high degree of uniformity in size, shape and polydispersity. Unlike the random clusters of the prior art, the core-shelled dendritic polymers of this invention are characterized by a single core dendrimer surrounded by and chemically bonded to at least 40% of the theoretical maximum number of shell dendritic polymer molecules that can be bonded to the core, the theoretical maximum number ($M_m$) of shell dendritic polymer molecules that can be bonded to the core dendritic polymer molecule being represented by the expression $$M_m = \frac{2\pi}{\sqrt{3}}\left(\frac{r_1}{r_2}+1\right)^2,$$

where $r_1$ is the radius of the core dendritic polymer molecule and $r_2$ is the radius of the shell dendritic polymer molecule.

The core dendritic polymer molecule and the shell dendritic polymer molecules can be selected from a variety of dendritic polymers, provided that the core dendritic polymer molecule includes terminal functional groups that are reactive with terminal functional groups of the shell dendritic polymer molecule.

Although it is conceivable that the core-shell tecto (dendrimers) can be prepared from random hyperbranched polymers, controlled hyperbranched polymers (dendrigrafts), and other non-ideal dendritic polymer molecules, ideal dendrimers and nearly ideal dendrimers, especially those having a nearly spherical or slightly elliptical shape are preferred. The dendritic polymer macromolecules useful in the practice of this invention are characterized by a relatively high degree of branching, which is defined as the number average fraction of branching groups per molecule (i.e., the ratio of terminal groups plus branch groups to the total number of terminal groups, branch groups and linear groups). For ideal dendrons and dendrimers, the degree of branching is 1. For linear polymers, the degree of branching is 0. A degree of branching of at least about 0.5 is desirable, and a degree of branching of at least about 0.9 is preferred.

The invention encompasses core-shell tecto(dendrimers) which are the reaction products of higher generation, higher molecular weight dendrimers beyond the de Gennes densepacked stage, i.e., dendritic polymers in which surface groups are sterically prohibited from participating in further dendritic growth and in which the surface of the dendritic polymer is characterized by low permeability. However, lower generation, lower molecular weight dendrimers exhibiting good container properties and good surface permeability are preferred. In the case of PAMAM dendrimers having an ammonia core, preferred generations include generations 3 through 8. Lower generation (2.5 or less) PAMAM dendrimers having an ammonia core are not as highly preferred because of their more elongate shape, and because of their relatively poor container properties. Higher generation (8.5 or more) PAMAM dendrimers with an ammonia core are useable, but are not as highly preferred because of their relatively low surface permeability and poor container properties. Preferred ethylenediamine core PAMAM dendrimers include generations 3 through 7, although higher generation or lower generation ethylene diamine core PAMAM dendrimers can be used.

A preferred method for preparing the core-shell tecto (dendrimers) is by preparing, or obtaining, a first solution containing dendritic polymer molecules having a plurality of terminal functional groups of a first type which are not reactive with each other; providing a second solution containing dendritic polymer molecules having a plurality of terminal functional groups of a second type which are not reactive with each other, but which are reactive with the terminal functional groups of the first type; and combining the first and second solutions under conditions in which the terminal groups of the first type react with the terminal groups of the second type to form a core-shell reaction product. The reaction products can be prepared under a variety of conditions, but are preferably prepared at moderate temperatures, i.e. from about room temperature to about 50° C., and at a moderate pressure, e.g., at about normal atmospheric pressure. A suitable reaction time is from several hours to several days.

The core-shell tecto(dendrimers) of this invention may be prepared by reacting a core dendrimer having functional groups of a first type which are not chemically reactive with each other, with an excess of shell dendrimers having functional groups of a second type which are not chemically reactive with each other or with the functional groups of the first type, but which interact or associate with the functional groups of the first type to form a self-assembled complex. After a desired self-assembled complex has been formed, the shell dendrimers can be bonded to the core dendrimer by addition of a suitable reagent (e.g., carbodiimide). The reaction is preferably carried out in a relatively dilute solution to prevent agglomeration and formation of clusters having non-uniform properties.

In the case of the reaction of a core dendrimer having amine terminal groups, with shell dendrimers having methyl ester terminal groups, the reaction may be carried out in the presence of lithium chloride, which tends to act as a catalyst, i.e., as an agent which accelerates the reaction.

A preferred method of preparing core-shell dendrimers involves the reaction of a core dendrimer having carboxylic acid terminal groups, with shell dendrimers having amine terminal groups, in the presence of lithium chloride, which is present in an equal molar quantity based on the number of terminal groups of both types. In the presence of lithium chloride, it is believed that the terminal groups become ionically bonded to one another, rather than covalently bonded. It is believed that this allows the terminal groups to become loosely associated with each other, thus allowing the shell dendrimers to become displaced by other shell dendrimers contacting the surface of the core dendrimer. This process allows realignment or adjustment of the shell dendrimers on the surface of the core dendrimer to give a more ideal self-assembled complex. This results in more efficient packing or filling of the shell dendrimers around the core dendrimer. After a sufficient period of time, e.g., 12–18 hours, carbodiimide is introduced. The carbodiinide causes the amine groups of the shell dendrimers to become covalently bonded to the carboxylic acid terminals on the core dendrimer. The result is more ideal (greater) filling of the shell, i.e., the number of shell dendrimers chemically bonded to the core dendrimer approaches the theoretical maximum.

The theoretical maximum number of spheres of a particular size which can be bonded or attached to a core sphere of a particular size, and the average number of spheres of a particular size which can randomly attach to a core sphere of a particular size are discussed in M. L. Mansfield, L. Rakesh and D. A. Tomalia, *The Random Parking Of Spheres On Spheres*, J. Chem. Phys., 105(8), Aug. 22, 1996. When the core dendritic polymer molecule and the shell dendritic polymer molecules are treated as perfect spheres, the theoretical maximum number of shell spheres which can be attached to the core sphere ($M_m$) is given by the mathematical expression $$M_m = \frac{2\pi}{\sqrt{3}}\left(\frac{r_1}{r_2}+1\right)^2,$$

where $r_1$ is the radius of the core sphere, and $r_2$ is the radius of each of the shell spheres. The radii of many dendritic polymers have been determined and published. For example, see Catheryn L. Jackson et al., Visualization Of Dendrimer Molecules by Transmission Electron Microscopy (TEM): Staining Methods and Cryo-TEM of Vitrified Solutions, Macromolecules, 31(18), 6259. However, in those cases where literature values are unavailable or suspect, radii can be accurately determined using a variety of analytical techniques including SEC, TEM, TPC, light-scattering, atomic force microscopy, etc.

As previously stated, it is desirable that the reaction to form the core-shell tecto(dendrimers) of this invention be carried out with an excess of shell dendrimers. Desirably, the reaction is carried out under conditions wherein the ratio of shell dendrimers to core dendrimers is at least 4, and more preferably at least 10. Desirably, the number of shell dendrimers chemically bonded to the core dendrimer is at least 25%, more desirably at least 40% or 50%, and even more desirably at least 75% of the theoretical maximum, as determined mathematically based on treating the dendrimers as perfect spheres.

In addition to forming core-shell tecto(dendrimers) comprising a single shell or layer of dendrimers of a second type chemically bonded to a core dendrimer, the invention also encompasses multiple layers or multiple shell tecto (dendrimers). For example, a core-shell dendrimer can be refunctionalized to form a core-shell tecto(dendrimer) having terminal functional groups of a first type, and subsequently reacted with dendrimers having functional groups of a second type, in which the functional groups are not reactive with functional groups of the same type, but in which the functional groups of the second type are reactive with the functional groups of the first type. In this manner, a second shell can be formed over the core-shell tecto (dendrimer). This process can be repeated a plurality of times to form generally any desired number of shells. As a specific example, a core comprising a dendrimer with amine terminal groups can be reacted with a plurality of shell dendrimers having methyl ester groups to form a core-shell tecto(dendrimer) having methyl ester terminal groups. Subsequently, the core-shell tecto(dendrimer) can be reacted with an excess of a polyamine, such as ethylene diamine, to form a core-shell tecto(dendrimer) having amine terminal groups. The amine terminated core-shell tecto(dendrimer) can be subsequently reacted with an excess of methyl ester terminated dendrimer molecules, with the ester terminated dendrimer molecules forming a second shell over the first shell. The process can be repeated to form additional shells as desired. As another specific example, a carboxylic acid terminated dendrimer can be prepared by reacting a methyl ester terminated dendrimer with an excess of succinic anhydride. An excess of the resulting carboxylic acid terminated PAMAM dendrimers can be reacted with an amine terminated core dendrimer to form a carboxylic acid terminated core-shell tecto(dendrimer). The carboxylic acid terminated core-shell tecto(dendrimer) can be reacted with an excess of a diamine, such as ethylene diamine to form an amine terminated core-shell tecto(dendrimer) which can be subsequently reacted with an excess of another carboxylic acid terminated dendrimer to form a second layer or shell over the first shell. Again, the procedure can be repeated as desired to form any number of layers.

EXPERIMENTAL

The present invention is illustrated in more detail by the following examples. The examples are intended to be illustrative, and should not be interpreted as limiting or otherwise restricting the scope of the invention.

EXAMPLE 1

To a 500 milliliter round bottom flask containing a stir bar was added 32 grams of a generation 3.5 PAMAM dendrimer having an ethylene diamine core. 32 grams of methanol were also added to the flask. The mixture was stirred until homogenous. To the mixture was added 7 grams of lithium chloride. The mixture was stirred until homogenous. Thereafter, a mixture containing 6 grams of a generation 6 PAMAM dendrimer having an ethylene diamine core and 20 grams of methanol were added drop wise over a period of 10 minutes. The mixture was warmed to 25° C. and placed in a constant temperature bath at 40° C. for 25 days. The generation 3.5 PAMAM dendrimers had methyl ester terminal groups, and the generation 6 PAMAM dendrimers had amine terminal groups. The mixture contained an excess of the shell polymer molecules having methyl ester terminal functional groups. By using an excess of shell polymer molecules, it is possible to form core-shell tecto(dendrimers) comprising a single core molecule and a plurality of shell molecules chemically bonded to and surrounding the core polymer molecule. The resulting core-shell tecto (dendrimers) are of relatively uniform size and shape, rather than the highly polydisperse, poorly defined clusters which are formed when equal amounts of amine terminated polymer and methyl ester terminal polymer are used.

After 25 days at 40° C., the mixture was cooled to 25° C. and 42 grams of tris(hydroxylmethyl)aminomethane and 22 grams of potassium carbonate were added. The resulting mixture was vigorously stirred for 18 hours at 25° C. The mixture was diafiltered in deionized water using an Amicon stainless steel tangential flow ultra filtration unit containing a 30K regenerated cellulose membrane to give 6 liters of permeate and 800 milliliters of ultra filtered retentate. The retentate was filtered through a Whatman No. 1 filter paper, freed of volatiles on a rotary evaporator, and evacuated with a high vacuum at 25° C. to give 20 grams of core-shell tectodendrinmer product.

EXAMPLES 3–4

The procedure outlined above in Example 1 was repeated for Examples 2 through 4, except Example 2 was performed with a generation 4 core dendrimer and a generation 3.5 shell dendrimer, Example 3 was performed with a generation 5 core dendrimer and a generation 2.5 shell dendrimer, and Example 4 was performed with a generation 7 core dendrimer and a generation 4.5 shell dendrimer.

EXAMPLE 5

An aqueous solution containing 0.5% by weight of an amine-terminated generation 5, ethylene diamine core PAMAM dendrimer was prepared. Lithium chloride was added to the aqueous solution in equal molar quantity based on the number of amine terminal groups. Thereafter, a solution containing 0.5% by weight of carboxylic acid terminated generation 3, ethylene diamine core PAMAM dendrimer and lithium chloride in equal molar quantity based on the number of carboxylic acid terminal groups was added. The carboxylic acid terminated generation 3 PAMAM dendrimer was prepared by reacting a generation 2.5 PAMAM dendrimer with an excess of succinic anhydride. The solution was equilibrated for 12–18 hours. Thereafter carbodiimide was added.

EXAMPLES 6 AND 7

The procedure of Example 5 was repeated for the reaction product of a generation 6, amine-terminated, ethylene diamine core PAMAM dendrimer, and a generation 3, carboxylic acid-terminated, ethylene diamine core dendrimer for Example 6; and with an amine-terminated generation 7, ethylene diamine core, dendrimer and a carboxylic acid-terminated, generation 3, ethylene diamine core dendrimer for Example 7.

RESULTS AND DISCUSSION

The reactions for Examples 14 were monitored by Fourier transform infrared spectroscopy (FTIR), Carbon-13 nuclear magnetic resonance ($^{13}$C-NMR), scanning electron microscopy (SEC) and gel electrophoresis. The reaction of the methyl ester terminated PAMAM dendrimers with the amine-terminated dendrimers in Examples 14 were confirmed by the formation of higher molecular weight, shorter retention time, products by SEC. Additional evidence was gained by observing a loss of the dendrimer core reagent migratory band present in the initial reaction mixture, accompanied by the formation of a higher molecular weight product at a much shorter migratory position on the electrophoretic gel. The molecular weight of the resulting tecto (dendrimer) core-shell molecules could be estimated by comparing the migratory distance of the core-shell product (PAGE results, Table 1) with the migration distances of the reagent PAMAM dendrimers.

The capping reactions, involving the reaction of terminal methyl ester groups on the tecto(dendrimers) with tris (hydroxylmethyl)aminomethane, were monitored by following the disappearance of an ester band by FTIR at 1,734 $cm^{-1}$. Isolation and characterization of these products prove that they were relatively mono-disperse spheroids as illustrated by atomic-force microscopy (AFM).

Molecular weights were also determined for the fmal products by matrix assisted laser desorption/ionization time-of-flight mass spectrometry (MALDI-TOF-MS and polyacrylamide gel electrophoresis (PAGE) and calculated from AFM dimension data (see Table 1).

Calculations based on these experimentally determined molecular weights allow the estimation of shell filling levels (i.e., the number of shell dendrimers chemically bonded to the core dendrimer). A comparison with mathematically predicted theoretical saturated shell structures (i.e., the theoretical maximum number of shell dendrimers which can be chemically bonded to a single dendrimer core) indicates that the core-shell tecto(dendrimer) products of Examples 14 are only partially filled (i.e., from about 40 to about 66% of the theoretical maximum, see Table 1).

The reactions for Examples 5–7 were monitored using size exclusion chromatography (SEC). The product from Example 5 was characterized using four different techniques while the products from Examples 6 and 7 were characterized only by SEC. For Examples 5–7, the breadth of the high molecular weight peak suggested that the products were mono-disperse. The product from Example 5 was also characterized using PAGE, MALDI-TOF-MS and AFM. PAGE results corroborate SEC results with a narrow band corresponding to a retention time between generation 7 and 8. The results from MALDI-TOF and AFM indicated a molecular weight similar to that of a generation 7 dendrimer. Based on these molecular weights, the number of shell dendrimers chemically bonded to the core dendrimer were calculated to be about 9. The theoretical maximum number of carboxylic acid-terminated, ethylene diamine core, generation 3 PAMAM dendrimers that can be chemically bonded to the surface of an amine-terminated, generation 5, ethylene diamine core PAMAM dendrimer is 12. Thus, approximately 75% filling was achieved in Example 7. The reason for incomplete filling may be due to the flexible nature of dendrimers at lower generations which leads to flattening of the shell dendrimers chemically bonded to the core dendrimer.

The resulting core-shell tecto(dendrimers) of this invention can be used in biomedicine, pharmaceuticals, personal care products, and in other ways analogous to the known uses for dendrimers, hypercomb branched polymers, and other dendritic polymers. However, the core-shell tecto (dendrimers) of this invention have potentially greater utility in certain applications, as they provide a means by which complex macromolecules having relatively precisely defined structure can be tailored to perform multiple functions. For example, the core dendritic polymer molecule can be loaded or conjugated with a first type of therapeutic or diagnostic agent and the shell dendritic polymer molecules can be loaded or conjugated with a second type of therapeutic or diagnostic agent.

The foregoing are merely preferred embodiments of the invention. Various changes and alterations can be made without departing from the spirit and broader aspects thereof as set forth in the appended claims, which are to be interpreted in accordance with the principles of patent law, including the doctrine of equivalents.

What is claimed is:

1. A composition of matter comprising:
   a reaction product of a core dendritic polymer molecular having a plurality of terminal functional groups of a first type which are not reactive with each other, and a plurality of shell dendritic polymer molecules having a plurality of terminal functional groups of a second type which are not reactive with each other, but which are reactive with the terminal functional groups of the first

TABLE 1

Analytical evidence for tecto(dendrimer) core shell molecules

| Example # | 1 | 2 | 3 | 4 |
|---|---|---|---|---|
| Theoretical Shell Sat. Levels (n) | 15 | 9 | 15 | 15 |
| Observed Shell Sat. Levels (n_) | 6–8 | 4 | 8–10 | 6 |
| Percent Theoretical Shell Sat. Levels | 40–53% | 44% | 53–66% | 40% |
| MALDI-TOF-MS (MW): | 227,606 | 56,496 | 120,026 | 288,970 |
| PAGE (MW): | 233,000 | 58,000 | 116,000 | 467,000 |
| AFM: Observed Dimensions: | 38 × 0.63 nm (D,H) | 25 × 0.38 nm (D,H) | 33 × 0.53 nm (D,H) | 43 × 1.1 nm (D,H) |
| CALC. (MW): | 214,000 | 56,000 | 136,000 | 479,000 | type, each of the shell dendritic polymer molecules chemically bonded to the core dendritic polymer molecule by a reaction of at least one of the terminal functional groups of the second type with at least one of the terminal functional groups of the first type, the reaction product having at least 40% of the theoretical maximum number ($M_m$) of dendritic polymer molecules of the second type that can be bonded to the core dendritic polymer molecule, wherein $$M_m = \frac{2\pi}{\sqrt{3}}\left(\frac{r_1}{r_2}+1\right)^2,$$

where $r_1$ is the radius of the core dendritic polymer molecule and $r_2$ is the radius of the shell dendritic polymer molecule.

2. A process for preparing a composition of matter which is the reaction product of a core dendritic polymer molecule and a plurality of shell dendritic polymer molecules surrounding and chemically bonded to the core dendritic polymer molecule, comprising:

providing the core dendritic polymer molecules, the dendritic core polymer molecules each having a plurality of terminal functional groups of a first type which are not reactive with each other;

providing the shell dendritic polymer molecules, the shell dendritic polymer molecules having a plurality of terminal functional groups of a second type which are not reactive with each other, but which are reactive with the terminal functional groups of the first type;

combining the core dendritic polymer molecules with the shell dendritic polymer molecules in a solution, the amounts of the core dendritic polymer molecules and the shell dendritic polymer molecules being selected so that the ratio of shell dendritic polymer molecules to core dendritic polymer molecules is at least 4:1; and reacting the terminal groups of the first type with the terminal groups of the second type to form a core-shell polymer which is the reaction product of a single core dendritic polymer molecule and a plurality of shell dendritic polymer molecules that are chemically bonded to, and surround, the core dendritic polymer molecules, the number of shell dendritic polymer molecules bonded to each core dendritic polymer molecule being at least 40% of the theoretical maximum number ($M_m$) that can be bonded to the core dendritic polymer molecule, wherein $$M_m = \frac{2\pi}{\sqrt{3}}\left(\frac{r_1}{r_2}+1\right)^2,$$

where $r_1$ is the radius of the core dendritic polymer molecule and $r_2$ is the radius of the shell dendritic polymer molecule.

3. The composition of matter comprising:

the reaction product of a single dendritic core polymer molecule, a plurality of shell dendritic polymer molecules chemically bonded to the surface of the core dendritic polymer molecule to form a first shell surrounding the core molecule, and a plurality of dendritic polymer molecules bonded to the shell dendritic polymer molecules to form a second shell surrounding the first shell.

4. The composition of claim 1 or 3 in which the terminal functional groups of the first type are amine groups and the terminal functional groups of the second type are methyl ester groups.

5. The composition of claim 1 or 3 in which the terminal functional groups of the first type are amine groups and the terminal functional groups of the second type are carboxylic acid functional groups.

6. The composition of claim 1 or 3 in which the core dendritic polymer molecules and the shell dendritic polymer molecules are at least third-generation dendrimers.

7. The composition of claim 1 or 3 in which the core dendritic polymer molecule is a polyamidoamine dendrimer having amine terminal groups and the shell dendritic polymer molecules are polyamidoamine dendrimers having methyl ester terminal groups or carboxylic acid terminal groups.

8. A composition of matter as claimed in claim 1 when prepared by the process as claimed in claim 2.

9. The process of claim 2 in which the terminal functional group of the core dendritic polymer molecule are amine-functional groups and the terminal functional groups of the shell dendritic polymer molecules are methyl ester groups or carboxylic acid groups.

10. The process of claim 2 in which the core dendritic polymer molecule is a polyamidoamine dendrimer having a amine terminal groups and the shell dendritic polymer molecules are polyamidoamine dendrimers having methyl ester terminal groups or carboxylic acid terminal groups.

* * * * *